United States Patent
Frias et al.

(10) Patent No.: US 12,107,304 B2
(45) Date of Patent: Oct. 1, 2024

(54) COORDINATION CHEMISTRY FLOW BATTERY ELECTROLYTE GROUND FAULT DETECTION

(71) Applicant: Lockheed Martin Energy, LLC, Bethesda, MD (US)

(72) Inventors: Rui Emanuel Frias, East Freetown, MA (US); Kevin Hartley Beverage, Sterling, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 260 days.

(21) Appl. No.: 17/513,470

(22) Filed: Oct. 28, 2021

(65) Prior Publication Data
US 2023/0139052 A1  May 4, 2023

(51) Int. Cl.
*H01M 8/249* (2016.01)
*H01M 8/04537* (2016.01)
*H01M 8/04664* (2016.01)
*H01M 8/18* (2006.01)

(52) U.S. Cl.
CPC ... *H01M 8/04671* (2013.01); *H01M 8/04552* (2013.01); *H01M 8/188* (2013.01); *H01M 8/249* (2013.01)

(58) Field of Classification Search
CPC ......... H01M 8/04671; H01M 8/04552; H01M 8/188; H01M 8/249
See application file for complete search history.

(56) References Cited

U.S. PATENT DOCUMENTS

| | | | |
|---|---|---|---|
| 5,399,445 A | 3/1995 | Tinker | |
| 6,337,559 B1 | 1/2002 | Sato | |
| 8,518,708 B2 | 8/2013 | Winter | |
| 9,136,564 B2 | 9/2015 | Yang et al. | |
| 9,306,248 B2 | 4/2016 | Yang et al. | |
| 10,714,785 B2 | 7/2020 | Gottlieb et al. | |
| 2011/0114496 A1* | 5/2011 | Dopp | H01M 4/8631 204/290.01 |
| 2014/0139228 A1 | 5/2014 | Tennessen et al. | |
| 2014/0220463 A1* | 8/2014 | Daniel | H01M 8/04425 429/415 |
| 2017/0279140 A1* | 9/2017 | Choudhury | H01M 8/18 |
| 2018/0175429 A1* | 6/2018 | Gottlieb | H01M 10/05 |
| 2020/0144641 A1* | 5/2020 | Song | H01M 8/04932 |

FOREIGN PATENT DOCUMENTS

| | | |
|---|---|---|
| CN | 102401881 A | 4/2012 |
| CN | 204649362 U | 9/2015 |
| CN | 103208598 B | 6/2016 |
| KR | 2015-0006147 A | 1/2015 |
| KR | 2017-0046438 A | 5/2017 |
| KR | 102205888 B1 | 1/2021 |
| WO | WO 2018/118809 A1 | 6/2018 |

OTHER PUBLICATIONS

International Patent Application No. PCT/US2022/078358; Int'l Search Report and the Written Opinion; dated Apr. 24, 2023; 12 pages.

* cited by examiner

*Primary Examiner* — Olatunji A Godo
(74) *Attorney, Agent, or Firm* — BakerHostetler

(57) ABSTRACT

A flow battery system is disclosed.

16 Claims, 4 Drawing Sheets

COORDINATION CHEMISTRY FLOW BATTERY ELECTROLYTE GROUND FAULT DETECTION

TECHNICAL FIELD

The present disclosure relates generally to a battery system and method, and more particularly, to detecting a fault within the battery system.

BACKGROUND

An electrochemical cell of a flow battery includes a cathode side and anode side separated by a separator arrangement. The cathode side can include a cathode current collector, a cathode electroactive material and an electrolyte. The anode side can include an anode current collector, an anode electroactive material and an electrolyte. The separator arrangement separating the cathode and anode sides, permits ionic flow therebetween. The current collectors, electroactive materials, electrolytes and separator arrangement thus form an electrochemical reactor that converts chemical energy to electricity. The current collectors can be electrically connected together to form an electrical circuit.

Detecting ground faults in a flow battery system and pinpointing their location is critical in reflow systems. A ground fault is an early indication of a possible leak in the system. The potential difference between the electrolyte and ground is significantly high. A pin hole leak, for example, provides a current conducting path to ground. This path has the potential to carry large amounts of current that can cause excess heat and damage to components of the battery system (e.g., tank liners, pumps, and pipes). If the leak is not detected, it can increase into a larger and larger hole, causing significant damage to the system and loss of electrolyte.

The information included in this Background section of the specification, including any references cited herein and any description or discussion thereof, is included for technical reference purposes only and is not to be regarded subject matter by which the scope of the invention is to be bound.

SUMMARY

The foregoing needs are met, to a great extent, by the battery system described herein. The battery system includes a fault detection system capable of 1.) determining the presence of a fault in the battery system, and 2.) the location of the fault in the battery system.

An aspect of the present disclosure provides a battery system. The battery system comprises a battery cell, a detection system, and a controller. The battery cell includes a positive enclosure configured to retain a positive electrolyte and a negative enclosure configured to retain a negative electrolyte. The detection system is electrically coupled between at least one of 1.) the positive electrolyte and a ground, and 2.) the negative electrolyte and the ground. The detection system is configured to detect a parameter of at least one of the positive electrolyte and the negative electrolyte. The controller is configured to receive the parameter from the detection system, compare the parameter to a reference parameter, and determine whether a leak exists in one of the positive and negative enclosures based on the comparison of the parameter to the reference parameter.

Another aspect of the present disclosure provides a method for detecting a leak in a flow battery system. The flow battery system includes a battery cell having an enclosure that defines a flow channel configured to receive an electrolyte within. The method comprises: detecting a parameter of the electrolyte within the enclosure; comparing the detected parameter to a reference parameter; and determining whether the leak exists in the enclosure based on the comparison of the parameter to the reference parameter.

Another aspect of the present disclosure provides a flow battery system. The flow battery system comprises a battery cell, a detection system, and a controller. The battery cell includes an enclosure that defines a flow channel configured to receive an electrolyte within. The detection system is electrically coupled between the electrolyte and a ground. The detection system comprises a first sensor and a second sensor. The first sensor is electrically coupled to the electrolyte at a first location within the enclosure. The first sensor is configured to sense a first parameter of the electrolyte at the first location. The second sensor is electrically coupled to the electrolyte at a second location within the enclosure. The second sensor is configured to sense a second parameter of the electrolyte at the second location.

The controller is configured to receive the first parameter and the second parameter from the detection system, compare the first parameter to a first reference parameter, compare the second parameter to a second reference parameter, determine whether a first leak exists at the first location based on the comparison of the first parameter to the first reference parameter, and determine whether a second leak exists at the second location based on the comparison of the second parameter to the second reference parameter.

This summary is not intended to identify key features or essential features of the claimed subject matter, nor is it intended to be used to limit the scope of the claimed subject matter. A more extensive presentation of features, details, utilities, and advantages of the present invention is provided in the following written description of various aspects of the invention, illustrated in the accompanying drawings, and defined in the appended claims.

DETAILED DESCRIPTION

Figure 1:
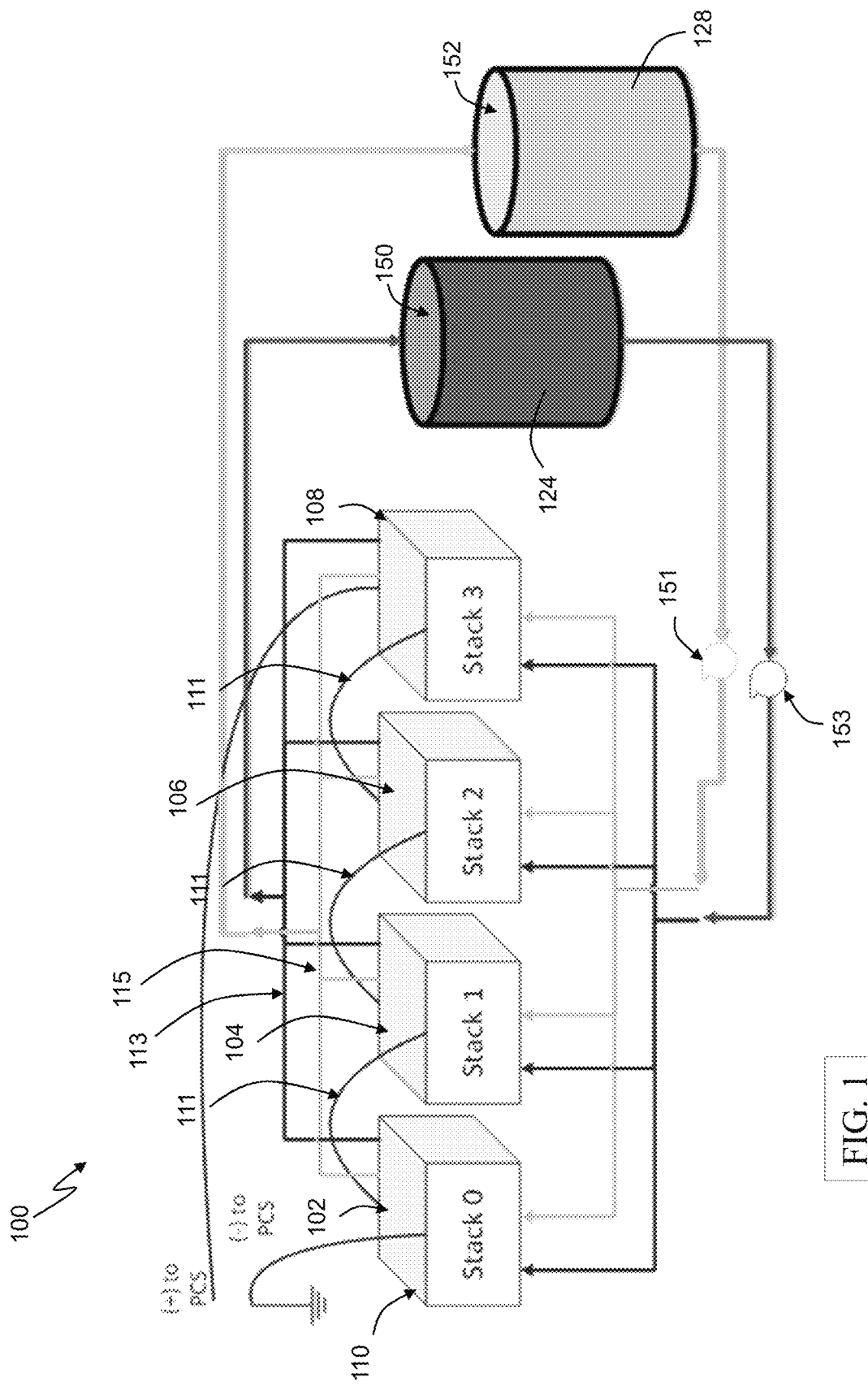
FIG. 1 illustrates a schematic view of a flow battery system, according to an aspect of this disclosure.

Certain terminology used in this description is for convenience only and is not limiting. The words "top", "bottom", "leading", "trailing", "above", "below", "axial", "transverse", "circumferential," and "radial" designate directions in the drawings to which reference is made. The term "substantially" is intended to mean considerable in extent or largely but not necessarily wholly that which is specified. All ranges disclosed herein are inclusive of the recited endpoint and independently combinable (for example, the range of "from 2 grams to 10 grams" is inclusive of the endpoints, 2 grams and 10 grams, and all the intermediate values). The terminology includes the above-listed words, derivatives thereof and words of similar import.

A flow battery system described herein includes an isolated detection system for measuring an electrolyte voltage as referenced to ground at specific locations in the battery system. The locations can include points with higher risk of leaks in the electrolyte fluidic system such as pumps, pipe flanges, valves, or still other locations. The measured voltage can be compared to an expected (or calculated) voltage based on a full battery string voltage. If the measured voltage differs from the expected voltage by a predetermined amount (e.g., 10%), a path to ground exists. The method of measuring the electrolyte voltage using an isolated means can also identify the location (or narrow down the location) where a fault in the battery system has occurred. The detection system can be implemented at multiple locations on the battery system, as described further below. The flow battery system can reduce the time for trouble shooting, down time, and repair costs.

FIG. 1 illustrates a schematic of a flow battery system 100. With the flow battery system 100, electrodes (e.g., terminal plates) at ends of each of the battery stacks connect electrolytes in supply manifolds with the voltage of the end cells. The flow battery system 100 includes four stacks 102, 104, 106, and 108 that are electrically connected to one another by electrical connections 111. It will be appreciated that the flow battery system 100 can include fewer than or more than four battery stacks. In an aspect, each of the battery stacks 110 can be arranged in series by electrical connections 111.

The flow battery system 100 further includes a negative electrolyte conduit 113, a positive electrolyte conduit 115, an anode tank 150, an anode pump 153, a cathode tank 152, and a cathode pump 151. The anode pump 153 is configured to pump a negative electrolyte 124 from the anode tank 150 through the negative electrolyte conduit 113 and through the battery stacks 110. Similarly, the cathode pump 151 is configured to pump a positive electrolyte 128 from the cathode tank 152 through the positive electrolyte conduit 115 and through the battery stacks 110. In an aspect, the electrolyte conduits 113 and 115 for each of the battery stack 110 can be arranged in parallel.

Figure 2:
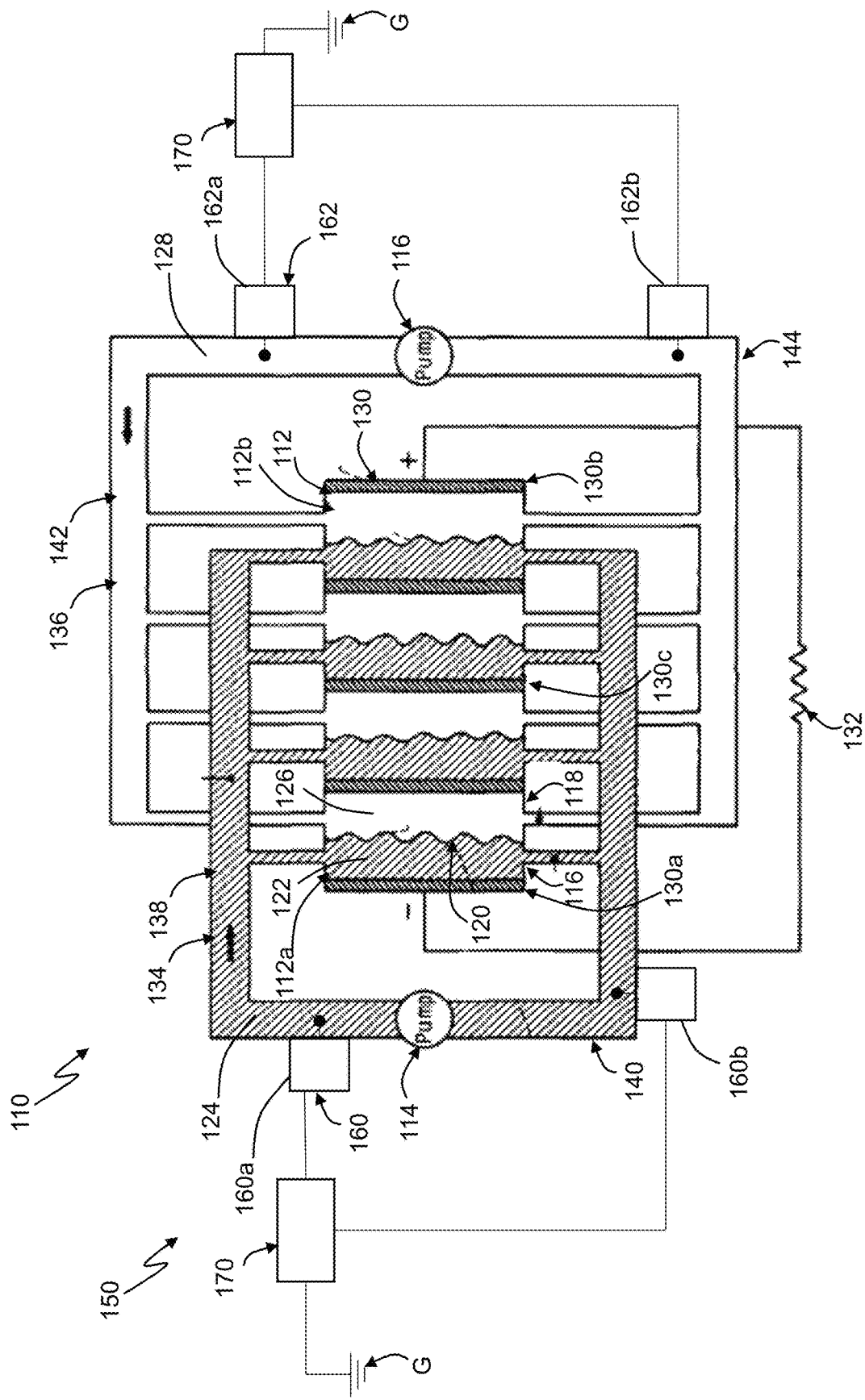
FIG. 2 illustrates a schematic of a flow battery stack of the flow battery system shown in FIG. 1, according to an aspect of this disclosure.

FIG. 2 illustrates a schematic of a flow battery stack 110 of the flow battery system 100, according to an aspect of this disclosure. The flow battery system 100 can include a plurality of flow battery stacks 110. Each battery stack 110 can include a plurality of independent battery cells 112. In an aspect, each plurality of battery cells 112 in one battery stack 110 is configured substantially similarly to each of the plurality of battery cells 112 in each of the other battery stacks 110.

The aspects illustrated in FIGS. 1 and 2 show four battery stack 110 and four battery cells 112. It will be appreciated that that the flow battery system 100 can include fewer or more battery stack 110 and battery flow cells 112. The battery flow cells 112 are a type of rechargeable cell in which electrolyte containing one or more dissolved electroactive species flows through (into and out of) an electrochemical reactor that converts chemical energy to electricity. Additional electrolyte containing one or more dissolved electroactive species is stored externally, generally in tanks 150 and 152, and is usually pumped through the electrochemical reactor (or electrochemical reactors) by pumps 151 and 153 and/or pumps 114 and 116 within each battery stack 110. The flow cells 112 can have variable capacity depending on the size of the external storage tanks.

With reference to FIG. 2, each flow cell 112 can include an anode side 116 and a cathode side 118 separated by a separator 120 (e.g., an ion exchange membrane). The anode side 116 includes a negative flow channel 122 configured to receive the negative electrolyte 124. The cathode side 118 includes a positive flow channel 126 configured to receive the positive electrolyte 128. The separator 120 permits ionic flow between electroactive materials in the negative flow channel 122 and the positive flow channel 126.

The flow battery stack 110 further includes electrodes 130. The electrodes 130 can include a first electrode 130a, a second electrode 130b, and at least one bipolar electrode 130c. The electrodes 130 can serve as current collectors. The first electrode 130a is connected to the anode side 116 of a first cell 112a of the flow cells 112. The second electrode 130b is connected to the cathode side 118 of a second cell 112b of the flow cells 112. Each bipolar electrode 130c can be connected between adjacent flow cells 112 of the battery stack 110. In an alternative, each cell 112 can include a negative electrode and a positive electrode, whereby the negative electrode and the positive electrode of adjacent cells 112 are separated by a bipolar plate (not shown).

The negative and positive flow channels 122, 126, the first and second electrodes 130a, 130b, the at least one bipolar electrode 130c, and the separator 120 form electrochemical reactor that converts chemical energy to electricity (and, in certain arrangements, electricity to chemical energy). The first electrode 130a and the second electrode 130b can be electrically connected together by a load 132 to form an electrical circuit.

The flow battery stack 110 further includes a negative manifold 134 and a positive manifold 136. The negative manifold 134 includes a negative enclosure that is configured to provide the negative electrolyte 124 to the negative flow channel 122 of each cell 112. Similarly, the positive manifold 136 includes a positive enclosure that is configured to provide the positive electrolyte 128 to the positive flow channel 126 of each cell. The negative manifold 134 can be connected to the negative flow channel 122 of each battery cell 112 in parallel. In this configuration, the negative electrolyte 124 can be supplied to each negative flow channel 122 from a supply negative manifold portion 138, and the negative electrolyte 124 flows through each negative flow channel 122 to a receive negative manifold portion 140. The negative electrolyte 124 can be pumped through the negative manifold 134 and each negative flow channel 122 by the pump 114. It will be appreciated that the anode tank 150 can contain the negative electrolyte 124.

Similarly, the positive manifold 136 can be connected to the positive flow channel 126 of each battery cell 112 in parallel. In this configuration, the positive electrolyte 128 can be supplied to each positive flow channel 126 from a supply positive manifold portion 142, and the positive electrolyte 128 can flow through each positive flow channel 126 to receive positive manifold portion 144. The positive electrolyte 128 can be pumped through the positive manifold 136 and each positive flow channel 126 by the pump 116. It will be appreciated that the cathode tank 152 can contain the positive electrolyte 128.

In an aspect, the manifolds 134, 136 can include flow directing structures to cause proper mixing of the electrolytes as they enter each respective flow channel 122, 126. Such flow directing structures may be configured to optimize the flow in each cell 112 within the flow battery stack 110 based upon the expected state of charge and other fluid properties within each cell 112.

The flow battery system 100 further includes a detection system 150. The detection system 150 is configured to sense or detect a parameter of either or both of the negative and positive electrolytes 124 and 128 as referenced to a ground G. The parameter can include, for example, an electrolyte voltage, an electrolyte current, or other electrolyte parameter. The detection system 150 includes a first at least one sensor 160, a second at least one sensor 162, and a controller 170. The detection system 150 can further include other components commonly used in voltage and/or current detection system, such as, for example, probes, additional sensors, disconnect switches, transceivers, or still other components.

As illustrated, the first at least one sensor 160 includes a first sensor 160a and a second sensor 160b. Similarly, the second at least one sensor 162 includes a third sensor 162a and a fourth sensor 162b. It will be appreciated that the detection system 150 can include fewer or more sensors than the four sensors shown. The sensors 160a and 160b are coupled to the negative manifold 134 to electrically couple the negative electrolyte 124 to the ground G. In an aspect, the sensors 160a and 160b are connected to the ground G via the controller 170. Similarly, sensors 162a and 162b are coupled to the positive manifold 138 to electrically couple the positive electrolyte 128 to the ground G. In an aspect, the sensors 162a and 162b are connected to the ground G via the controller 170. The at least one first sensor 160 can provide a signal to the controller 170 indicative of a direct measurement of the parameter of the negative electrolyte 124. Similarly, the at least one second sensor 162 can provide a signal to the controller 170 indicative of a direct measurement of the parameter of the positive electrolyte 128.

The controller 170 is configured to record data received from the first and second at least one sensors 160 and 162 and determine whether a fault exits in the flow battery system 100 based on at least the data received from the sensors 160 and 162. The controller 170 can be an electronic control unit, system computer, central processing unit, or other data storage manipulation device that may be used to facilitate control and coordination of any of the methods or procedures described herein. While the controller 170 is represented as two units in FIG. 2, in other aspects the controller 170 may be a single unit or distributed as a plurality of distinct but interoperating units, incorporated into another component, or located at different locations on or off the flow battery system 100.

Figure 3:
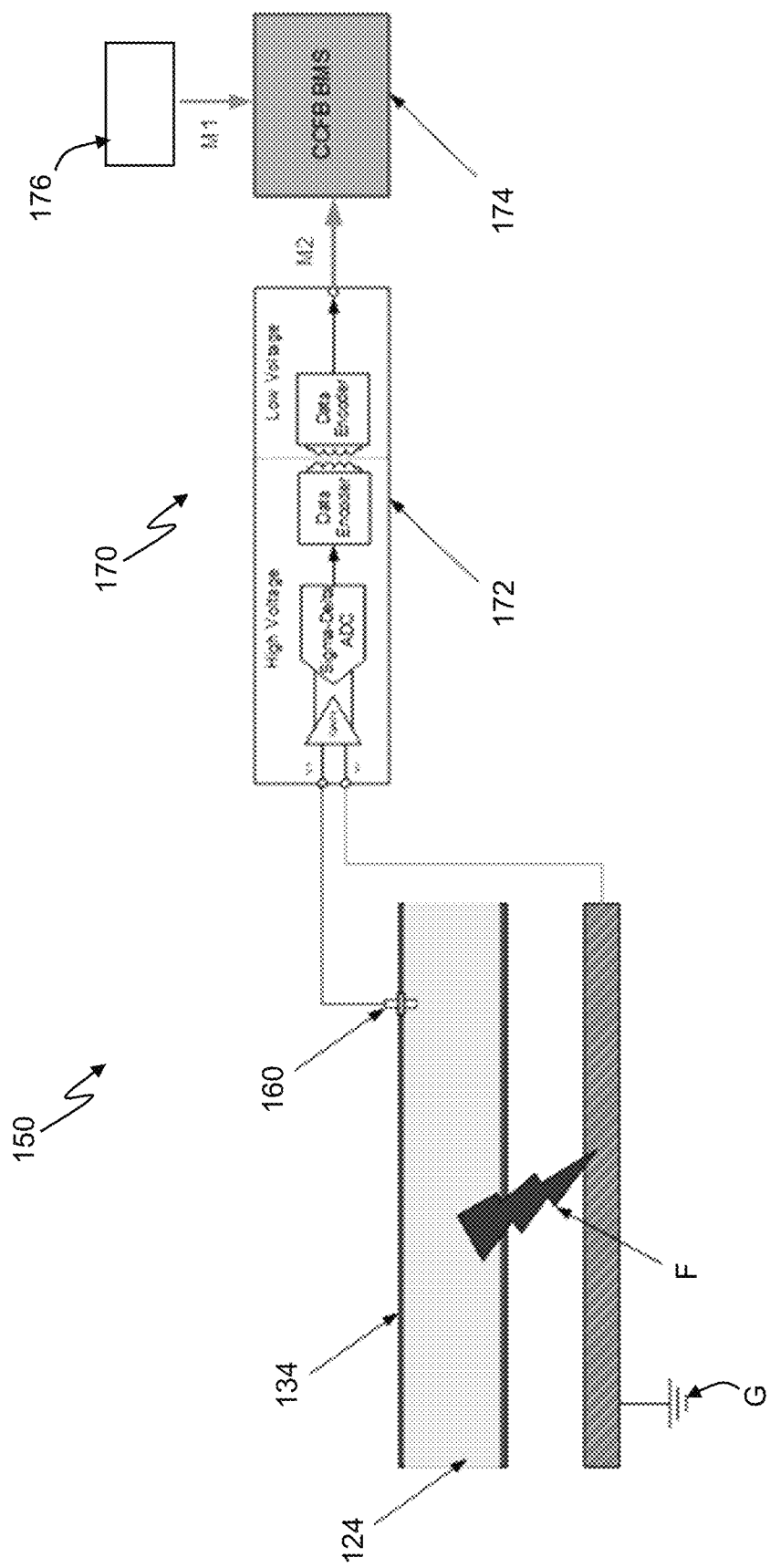
FIG. 3 illustrates a schematic view of a detection system, according to an aspect of this disclosure.

FIG. 3 illustrates a schematic view of the detection system 150, according to an aspect of this disclosure. For illustrative purposes, only a portion of the battery stack 110 is shown (e.g., the negative manifold 134). The controller 170 includes a measurement and isolation barrier 172 and a battery management system 174 (BMS). The barrier 172 is coupled between the first sensor 160 and the BMS 174, and the barrier 172 is also coupled between the first sensor 160 and the ground G. It will be appreciated that the detection system 150 can include more than one barrier 172. For example, each at least one sensor 160 and 162 can be electrically coupled to the BMS 174 via a respective barrier 172. The barrier 172 is configured to receive the signal from the sensor 160 and transmit a detected signal (M2) indicative of the detected parameter of the electrolyte to the BMS 174.

The BMS 174 is configured to receive and store in a memory the detected signal (M2) from the barrier 172 and an expected signal (M1) received from an external source 176. The expected signal (M1) can include, for example, a modeled parameter (e.g., a modeled voltage or a modeled current) of the electrolyte. The modeled parameter can be determined based on a model of the flow battery system 100. The model of the flow battery system 100 can include, for example, an un-faulted flow battery system, a simulation of a flow battery system, combinations thereof, or still other models capable of determining an expected parameter of the electrolyte. In an aspect, the modeled parameter is an expected modeled voltage as is referenced to a full battery string voltage at a most positive battery stack of the system 100.

The BMS 174 can include a processor, such as a microprocessor, and a memory. The processor may be coupled to and configured to receive signals from the barrier 172 and the external source 176. Examples of processors include computing devices and/or dedicated hardware as defined herein, but are not limited to, one or more central processing units and microprocessors. In an aspect, the BMS 174 can include an optional communications module to send and receive signals from various locations, either on or remote from the flow battery system 100.

The BMS 174 is configured to compare the detected parameter received from the barrier 172 with the expected parameter from the external source 176. If the detected parameter differs from the expected parameter by a predetermined value, a fault F in the flow battery system 100 can exist. The predetermined value can be stored in the memory of the BMS 174. The predetermined value can be modified or adjusted based on, for example, a particular location of the sensors 160 and 162. The predetermined value can include a percentage difference between the detected parameter and the expected parameter. For example, if the predetermined value is 10%, then the BMS 174 can indicate whether the potential fault F exists when the detected parameter differs from the expected parameter by 10%. If the potential fault F does exist, the BMS 174 can trigger an alarm, either visual, audible, or both, to indicate that the fault F exists in the battery system 100.

When the potential fault F is determined by the BMS 174, a location of the potential fault F can be identified. For example, if the detected parameter that was detected by the first sensor 160a is different from the expected parameter by the predetermined value, then the fault F in the battery system 100 is proximate to the location of the first sensor 160a. Similarly, if the detected that was detected by the second sensor 160b is different from the expected parameter by the predetermined value, then the fault F in the battery system 100 is proximate to the location of the second sensor 160b. It will be appreciated that the expected parameter at the location of the first sensor 160a can be different than the expected parameter at the location of the second sensor 160b.

Multiple first and second sensors 160 and 162 can be deployed throughout the battery system 100 to detect parameters of the negative and positive electrolytes 124 and 128. In an aspect the first and second sensors 160 and 162 can be positioned proximate to higher risk of fault locations on the battery system 100. Higher risk fault locations can include, for example, pumps, pipe flanges, valves, or other high resistance locations in the electrolyte loop.

The flow battery system 100 can be operated by controlling the pumps 114 and 116 to cause a negative electrolyte and a positive electrolyte to flow from tanks 150 and 152 through the negative and positive manifolds 134 and 136, respectively. As the electrolytes flow through the respective negative and positive flow channels 122 and 126 of each battery cell 112, an ion exchange occurs through each separator 120, and an electrical circuit is formed between each of the battery cells 112 and the load 132.

While the electrolytes are flowing through the negative and positive flow channels 122 and 126 of each battery cell 112, the first at least one sensor 160 is detecting the parameter of the negative electrolyte 124 flowing through the negative flow channel 122, and the second at least one sensor 162 is detecting the parameter of the positive electrolyte 128 flowing through the positive flow channel 126. The detected parameters are sent to the controller 170. The controller 170 compares the detected parameter with the expected parameter (e.g., reference parameter). If the difference between the detected parameter differs from the expected parameter by a predetermined value, the controller 170 determines that a fault exists in one of or both of the positive and negative enclosures 134 and 136.

Figure 4:
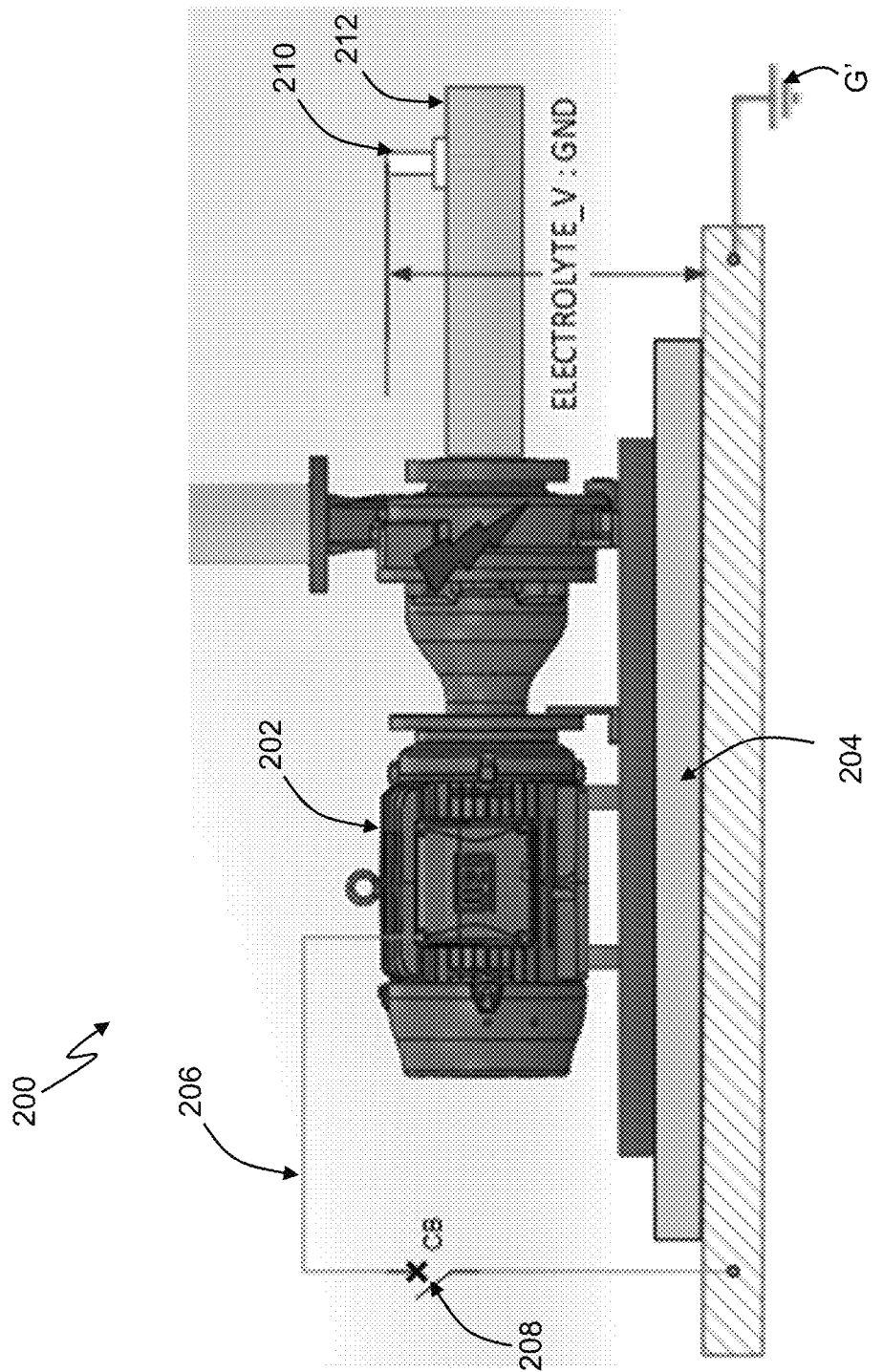
FIG. 4 illustrates a side view of a portion of a test battery system, according to an aspect of this disclosure.

FIG. 4 illustrates a side view of a portion of a test battery system 200, according to an aspect of this disclosure. The battery system 200 includes a pump 202 configured to pump electrolyte through the battery system 100. The pump 202 can comprise the pump 114, the pump 116, or other pump configured to pump electrolyte. An insulating barrier 204 is positioned between the pump 202 and a ground G'. The insulating barrier 204 "floats" the pump 202, thereby removing the path to ground G'. A grounding conductor 206 is placed between the pump 202 and the ground G'. The grounding conductor 206 includes a circuit breaker 208 configured to selectively ground the pump 202. A sensor 210 is electrically coupled between an electrolyte within an enclosure 212 of the battery system 200 and the ground G'.

Table 1 below represents sample results from a test scenario of the battery system 200. The data in the first row represents an electrolyte voltage and current when the pump 202 is operational and the circuit breaker 208 is open. The data in the second row represents an electrolyte voltage and current when the pump is operational and the circuit breaker 208 is closed and a fault exists proximate the sensor 210.

TABLE 1

| Circuit Breaker | Electrolyte Voltage | Ground Current |
| --- | --- | --- |
| Open (e.g., pump floating) | 247 V | 34-66 mA |
| Closed (e.g., grounded) | 41 V | 1.62 A |

As represented by the sample results, electrolyte voltage at the area of the ground fault/leak is greatly impacted by the presence of a fault. Once the circuit breaker 208 is closed, the pump 202 is grounded, which puts the fault in the circuit. When the fault is in the circuit, the electrolyte voltage drops from approximately 250V to 40V. This change in voltage of around 200V allows the detection system 150 to determine whether a fault exists in the battery system 200 and the approximate location of the fault (e.g., proximate the sensor 210).

The flow battery system 100 can provide operational and statistical data that can be utilized in development of advanced algorithms to determine the health of the system ground isolation and better understanding of fluidic voltage in the system 100. Electrolyte voltage can also be monitored during a shutdown and voltage data decay versus time can be utilized as another data point of possible battery system 100 issues.

The detection system 150 can be implemented in multiple areas of the battery system 100, which can offer better sensitivity to faults and provide greater protection than conventional detection systems. The detection system 150 can aid in the narrowing down and accuracy of determining the location of a fault in the battery system 100, which can reduce downtime and the time to troubleshoot. This can be particularly important when the detection system 150 is implemented on a large battery system 100, for example, a reflow energy storage system, whereby determining the location of a fault can be time consuming and costly. The detection system 150 can also provide an early detection of faults before the battery system 100 suffers increasing damage.

It will be apparent to those of ordinary skill in the art that variations and alternative embodiments may be made given the foregoing description. Such variations and alternative embodiments are accordingly considered within the scope of the present invention.

Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

The above specification, examples and data provide a complete description of the structure and use of exemplary aspects of the disclosed technology. Although various aspects of the disclosed technology have been described above with a certain degree of particularity, or with reference to one or more individual aspects, those skilled in the art could make numerous alterations to the disclosed aspects without departing from the spirit or scope of this disclosed technology. Other aspects are therefore contemplated. It is intended that all matter contained in the above description and shown in the accompanying drawings shall be interpreted as illustrative only of particular aspects and not limiting. Changes in detail or structure may be made without departing from the basic elements of the disclosed technology as defined in the following claims.

Aspects

The following Aspects are illustrative only and do not serve to limit the scope of the present disclosure or the appended claims.

Aspect 1. A flow battery system, comprising:

a battery cell including a positive enclosure configured to retain a positive electrolyte and a negative enclosure configured to retain a negative electrolyte;

a detection system electrically coupled between at least one of 1.) the positive electrolyte and the ground, and 2.) the negative electrolyte and the ground, the detection system being configured to detect a parameter of at least one of the positive electrolyte and the negative electrolyte; and a controller configured to receive the parameter from the detection system, compare the parameter to a reference parameter, and determine whether a leak exists in one of the positive and negative enclosures based on the comparison of the parameter to the reference parameter.

Aspect 2. The battery system of Aspect 1, wherein the battery system comprises a flow battery system Aspect 3. The battery system of Aspect 1, wherein the battery cell is a first cell of a plurality of cells, wherein each of the plurality of cells includes a respective positive enclosure configured to receive the positive electrolyte and a respective negative enclosure configured to receive the negative electrolyte.

Aspect 4. The battery system of Aspect 3, wherein the plurality of cells are arranged in series from the first cell of the plurality of cells to a second cell of the plurality of cells.

Aspect 5. The battery system of Aspect 3, wherein the plurality of cells is a first plurality of cells, the battery system further comprising:

a first battery stack, wherein the first battery stack comprises the first plurality of cells; and a second battery stack comprising a second plurality of cells, wherein the second plurality of cells is configured substantially similarly as the first plurality of cells.

Aspect 6. The battery system of Aspect 1, wherein the parameter comprises a voltage.

Aspect 7. The battery system of Aspect 6, wherein the reference parameter is an expected voltage predetermined based on a model of the battery system.

Aspect 8. The battery system of Aspect 1, wherein the detection system comprises at least one sensor configured to detect the parameter.

Aspect 9. The battery system of Aspect 8, wherein the at least one sensor comprises a plurality of sensors, wherein a first of the plurality of sensors is electrically coupled to at least one of the positive and negative electrolytes at a first location, and wherein a second of the plurality of sensors is electrically coupled to at least one of the positive and negative electrolytes at a second location, wherein the second location is a different location than the first location.

Aspect 10. The battery system of Aspect 9, further comprising:

a positive electrolyte pump configured to pump the positive electrolyte through the positive enclosure; and a negative electrolyte pump configured to pump the negative electrolyte through the negative enclosure, wherein at least one of the plurality of sensors is positioned at an outlet of at least one of the positive and negative electrolyte pumps.

Aspect 11. A method for detecting a leak in a flow battery system, the flow battery system including a battery cell having an enclosure that defines a flow channel configured to receive an electrolyte within, the method comprising:

detecting a parameter of the electrolyte within the enclosure;

comparing the detected parameter to a reference parameter; and determining whether the leak exists in the enclosure based on the comparison of the parameter to the reference parameter.

Aspect 12. The method of Aspect 11, wherein the parameter is a first parameter and the reference parameter is a first reference parameter, and wherein the first parameter is detected at a first location within the enclosure, the method further comprising:

detecting a second parameter of the electrolyte at a second location within the enclosure;

comparing the second detected parameter to a second reference parameter; and determining whether a leak exists in the enclosure based on the comparison of the second parameter to the second reference parameter.

Aspect 13. The method of Aspect 12, wherein the first parameter comprises a first voltage of the electrolyte at the first location, and wherein the second parameter comprises a second voltage of the electrolyte at the second location.

Aspect 14. The method of Aspect 11, further comprising:

calculating the reference parameter based on a model of the flow battery system.

Aspect 15. The method of Aspect 14, wherein the reference parameter is an expected voltage that is predetermined before the determining step.

Aspect 16. The method of Aspect 11, wherein the flow battery system further includes an electrolyte pump, wherein the electrolyte pump defines at least a portion of the enclosure, and wherein the parameter of the electrolyte is detected at an outlet of the electrolyte pump.

Aspect 17. The method of Aspect 11, wherein the step of detecting the parameter is performed by a sensor electrically coupled between the electrolyte within the enclosure and a ground, the method further comprising:

determining a location of the leak in the enclosure based on a location of the sensor.

Aspect 18. A flow battery system comprising:

a battery cell including an enclosure that defines a flow channel configured to receive an electrolyte within;

a detection system electrically coupled between the electrolyte and a ground, the detection system comprising:

a first sensor electrically coupled to the electrolyte at a first location within the enclosure, the first sensor being configured to sense a first parameter of the electrolyte at the first location, and a second sensor electrically coupled to the electrolyte at a second location within the enclosure, the second sensor being configured to sense a second parameter of the electrolyte at the second location; and a controller configured to receive the first parameter and the second parameter from the detection system, compare the first parameter to a first reference parameter, compare the second parameter to a second reference parameter, determine whether a first leak exists at the first location based on the comparison of the first parameter to the first reference parameter, and determine whether a second leak exists at the second location based on the comparison of the second parameter to the second reference parameter.

What is claimed:

1. A battery system, comprising:
    a flow battery cell including a positive enclosure configured to retain a positive electrolyte and a negative enclosure configured to retain a negative electrolyte;
    a detection system electrically coupled between at least one of 1.) the positive electrolyte and a ground, and 2.) the negative electrolyte and the ground, the detection system being configured to detect a voltage or current parameter of at least one of the positive electrolyte and the negative electrolyte; and
    a controller configured to receive the voltage or current parameter from the detection system, compare the voltage or current parameter to a reference voltage or current parameter, and determine whether an electrolyte leak exists in one of the positive and negative enclosures based on the comparison of the voltage or current parameter to the reference parameter.

2. The battery system of claim 1, wherein the flow battery cell is a first cell of a plurality of cells, wherein each of the plurality of cells includes a respective positive enclosure configured to receive the positive electrolyte and a respective negative enclosure configured to receive the negative electrolyte.

3. The battery system of claim 2, wherein the plurality of cells are arranged in series from the first cell of the plurality of cells to a second cell of the plurality of cells.

4. The battery system of claim 2, wherein the plurality of cells is a first plurality of cells, the battery system further comprising:
    a first battery stack, wherein the first battery stack comprises the first plurality of cells; and
    a second battery stack comprising a second plurality of cells, wherein the second plurality of cells is configured substantially similarly as the first plurality of cells.

5. The battery system of claim 1, wherein the voltage or current parameter comprises a voltage.

6. The battery system of claim 5, wherein the reference voltage or current parameter is an expected voltage predetermined based on a model of the battery system.

7. The battery system of claim 1, wherein the detection system comprises at least one sensor configured to detect the voltage or current parameter.

8. The battery system of claim 7, wherein the at least one sensor comprises a plurality of sensors, wherein a first of the plurality of sensors is electrically coupled to at least one of the positive and negative electrolytes at a first location, and wherein a second of the plurality of sensors is electrically coupled to at least one of the positive and negative electrolytes at a second location, wherein the second location is a different location than the first location.

9. The battery system of claim 8, further comprising:
a positive electrolyte pump configured to pump the positive electrolyte through the positive enclosure; and
a negative electrolyte pump configured to pump the negative electrolyte through the negative enclosure,
wherein at least one of the plurality of sensors is positioned at an outlet of at least one of the positive and negative electrolyte pumps.

10. A method for detecting an electrolyte leak in a flow battery system, the flow battery system including a battery cell having an enclosure that defines a flow channel configured to receive an electrolyte within and the flow battery system further including an electrolyte pump that defines at least a portion of the enclosure, the method comprising:
detecting a voltage or current parameter of the electrolyte within the enclosure;
comparing the detected voltage or current parameter to a reference voltage or current parameter; and
determining whether the electrolyte leak exists in the enclosure based on the comparing of the voltage or current parameter to the voltage or current reference parameter, and
wherein the voltage or current parameter of the electrolyte is detected at an outlet of the electrolyte pump.

11. The method of claim 10, wherein the voltage or current parameter is a first voltage or current parameter and the reference voltage or current parameter is a first voltage or current reference parameter, and wherein the first voltage or current parameter is detected at a first location within the enclosure, the method further comprising:
detecting a second voltage or current parameter of the electrolyte at a second location within the enclosure;
comparing the second detected voltage or current parameter to a second reference parameter; and
determining whether the electrolyte leak exists in the enclosure based on the comparing of the second voltage or current parameter to the second voltage or current reference parameter.

12. The method of claim 11, wherein the first voltage or current parameter comprises a first voltage of the electrolyte at the first location, and wherein the second voltage or current parameter comprises a second voltage of the electrolyte at the second location.

13. The method of claim 10, further comprising:
calculating the reference voltage or current parameter based on a model of the flow battery system.

14. The method of claim 13, wherein the reference voltage or current parameter is an expected voltage that is predetermined before the determining.

15. The method of claim 10, wherein the step of detecting the voltage or current parameter is performed by a sensor electrically coupled between the electrolyte within the enclosure and a ground, the method further comprising:
determining a location of the electrolyte leak in the enclosure based on a location of the sensor.

16. A flow battery system comprising:
a battery cell including an enclosure that defines a flow channel configured to receive an electrolyte within;
a detection system electrically coupled between the electrolyte and a ground, the detection system comprising:
a first sensor electrically coupled to the electrolyte at a first location within the enclosure, the first sensor being configured to sense a first voltage or current parameter of the electrolyte at the first location, and
a second sensor electrically coupled to the electrolyte at a second location within the enclosure, the second sensor being configured to sense a second voltage or current parameter of the electrolyte at the second location; and
a controller configured to receive the first voltage or current parameter and the second voltage or current parameter from the detection system, compare the first voltage or current parameter to a first reference voltage or current parameter, compare the second voltage or current parameter to a second reference voltage or current parameter, determine whether a first electrolyte leak exists at the first location based on the comparing of the first voltage or current parameter to the first reference voltage or current parameter, and determine whether a second electrolyte leak exists at the second location based on the comparing of the second voltage or current parameter to the second reference voltage or current parameter.

* * * * *